United States Patent [19]

Anjier et al.

[11] Patent Number: 4,511,542

[45] Date of Patent: Apr. 16, 1985

[54] BAYER PROCESS PRODUCTION OF ALUMINA HYDRATE

[75] Inventors: Joseph L. Anjier; Morris L. Roberson, both of Baton Rouge; William E. Atchison, Greenwell Springs, all of La.

[73] Assignee: Kaiser Aluminum & Chemical Corporation, Oakland, Calif.

[21] Appl. No.: 613,701

[22] Filed: May 24, 1984

[51] Int. Cl.³ ............................................. C01F 7/14
[52] U.S. Cl. .................................. 423/127; 423/121; 423/629; 23/301; 23/305 A
[58] Field of Search .................. 423/121, 127, 629; 23/301, 305 A

[56] References Cited

U.S. PATENT DOCUMENTS

| | | | |
|---|---|---|---|
| 2,707,669 | 5/1955 | Houston et al. | 423/119 |
| 3,486,850 | 12/1969 | Day | 423/127 |
| 4,234,559 | 11/1980 | Tschamper | 423/127 |
| 4,305,913 | 12/1981 | Anjier | 423/127 |
| 4,311,486 | 1/1982 | Yamada et al. | 423/127 |
| 4,364,919 | 12/1982 | Yamada et al. | 423/127 |

FOREIGN PATENT DOCUMENTS 2807245 3/1979 Fed. Rep. of Germany ...... 423/127

Primary Examiner—Herbert T. Carter
Attorney, Agent, or Firm—Andrew E. Barlay

[57] ABSTRACT

An improved precipitation system is provided for the Bayer process production of alumina hydrate. In order to produce coarse and strong alumina hydrate at high yield, supersaturated Bayer process sodium aluminate liquor is seeded with a relatively small seed charge in a first precipitator at a relatively low temperature and the produced slurry is transferred to a second precipitator where without additional seeding, the solids content of the slurry is allowed to increase to about 250–700 g/l by accumulating solids in the line until the desired solids content is reached. After a suitable residence time, a coarse, strong product hydrate can be recovered in yields of or exceeding 80 g/l based on the alumina ($Al_2O_3$) content of the supersaturated sodium aluminate liquor subjected to precipitation. The process not only produces the desired product at high yield but also, due to the use of a single, small seed charge, the precipitation system requires fewer precipitators and classifiers for a given residence time. Additionally, it allows significant energy savings by eliminating the need for cooling during the precipitation cycle due to the lower than conventional temperatures which can be utilized in the first precipitator.

9 Claims, 2 Drawing Figures

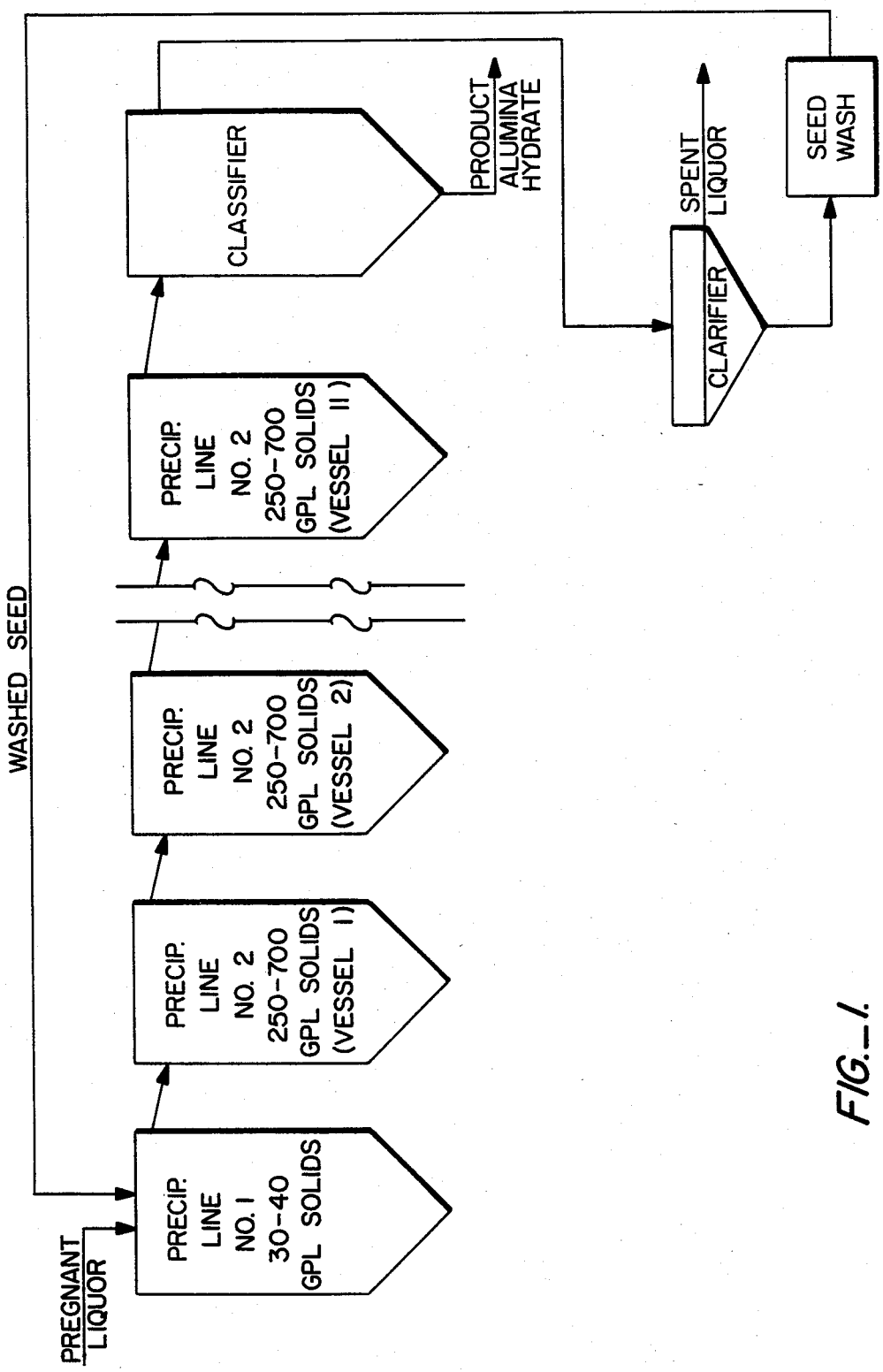
FIG._1.

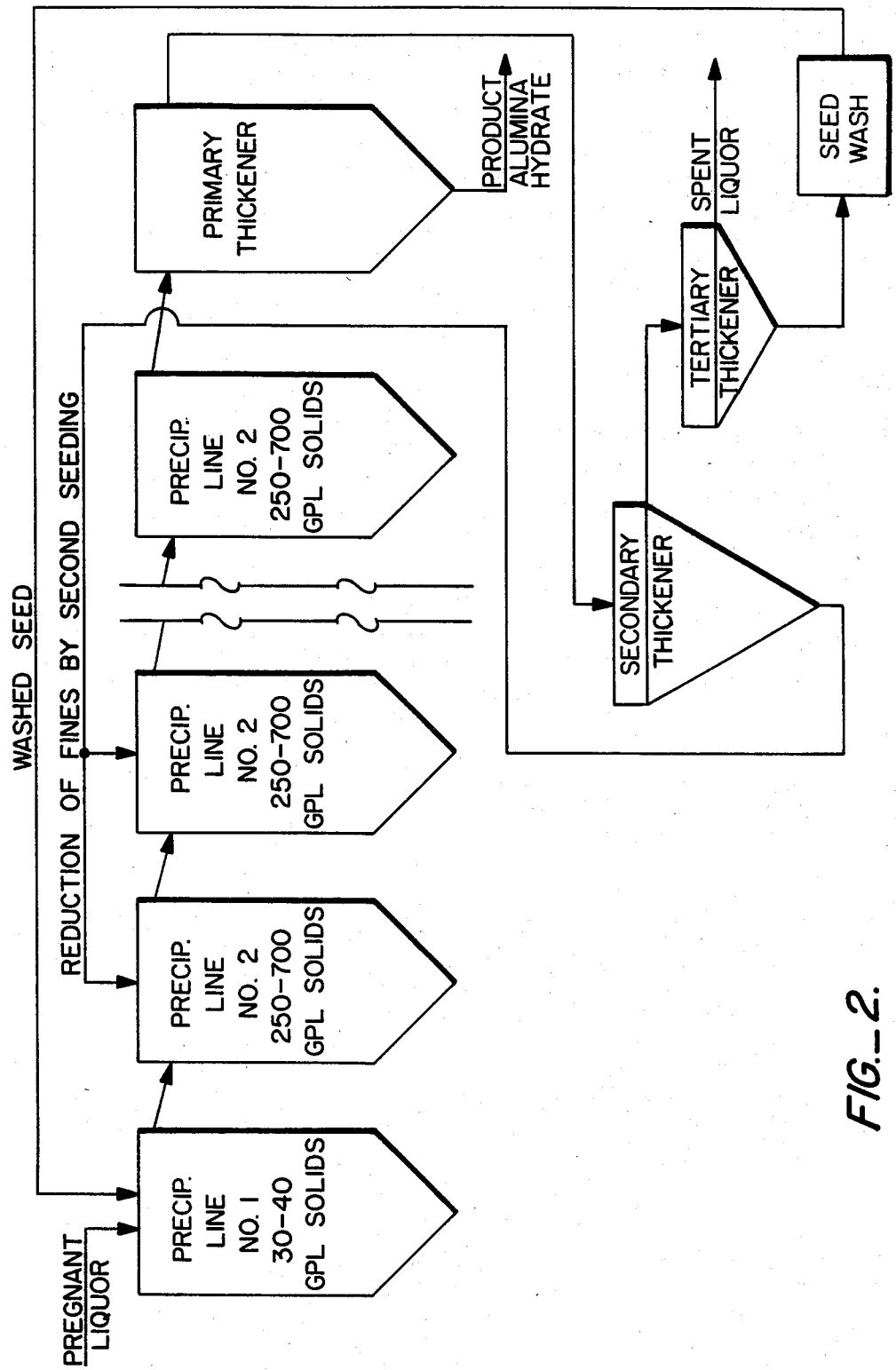
FIG._2.

BAYER PROCESS PRODUCTION OF ALUMINA HYDRATE

BACKGROUND OF THE INVENTION

This invention relates to an improved precipitation process for the production of alumina hydrate from Bayer process sodium aluminate liquors. More particularly, it relates to a precipitation process which produces coarse and strong alumina hydrate at high yields while simultaneously achieving energy savings, as well as reduced equipment and operating costs.

The Bayer process production of alumina hydrate has been practiced since 1888, and the process involves digestion of bauxite with an aqueous caustic medium at elevated temperatures and pressures. Digestion results in a slurry consisting of a liquor containing the alumina values dissolved from the bauxite in the form of sodium aluminate and a caustic-insoluble digestion residue, the so-called "red mud". The red mud is generally separated from the liquor and the alumina content of the liquor is recovered by precipitation. Precipitation is usually induced by seeding the sodium aluminate liquor with solid alumina hydrate and the precipitated alumina hydrate is recovered. Precipitation of alumina hydrate from the sodium aluminate liquor is an involved operation due to the many process variables and the product quality requirements. The process variables involved in the precipitation step, such as temperature, seed charge, holding time, alumina and caustic concentrations, impurity content, etc., affect product quality and yield, and, consequently, this operation requires close control, as well as a thorough understanding of the precipitation process.

The desired characteristics of the alumina hydrate produced by the Bayer process include suitable particle size distribution which is typically measured by screen analysis. To reduce dusting and improve aluminum reduction cell operations, the +325 mesh screen fraction (+44 microns) is used as an industry standard for comparing alumina hydrates for suitability. Generally, only a small quantity of less than 44 micron size particles is allowed. Another factor is strength, which is represented by resistance to abrasion during handling and particularly during calcination, again to avoid excessive dusting. In addition to these quality requirements, it is also important that the alumina hydrate produced by precipitation should be recovered at high yields at a minimum of energy input and at the lowest possible capital equipment cost requirement. Energy savings can be achieved, for example, by conducting the precipitation at relatively low temperatures, i.e., below about 68° C. (155° F.) and equipment costs can be minimized by eliminating the need of a cooling stage between precipitation stages and also by reducing the need for costly precipitators and classifiers which separate the coarse alumina hydrate fraction from the fines.

Over the years, many efforts were made to improve the precipitation stage of the Bayer process to achieve the above-stated goals. In the American Bayer process practice, major emphasis was placed on obtaining a coarse, "sandy" product of high strength. The yield of alumina hydrate, however, was unsatisfactory. In the European Bayer process practice, the yield of alumina hydrate was relatively high in comparison to the American Bayer process; however, the product was too fine and required overcalcination to reduce dustiness. Overcalcination reduces the surface area of the alumina and makes it unsuitable for dry scrubbing in state of the art aluminum reduction facilities. Both processes, the American and the European, had certain advantages, but these advantages were always accompanied by unavoidable difficulties and disadvantages.

During the past few years, several proposals were made to combine the advantages of both of these processes without the accompanying disadvantages. Thus, U.S. Pat. No. 4,234,559 (1980) describes a two-stage precipitation method, each stage proceeding within defined temperature ranges, and to each stage, seed alumina hydrate of different particle size distribution is added to induce precipitation. In the first stage, fine seed is added in such an amount as to provide a defined seed surface area to aluminate liquor ratio, expressed in g/l supersaturation per $m^2$ seed surface area in the range of 7–25. In the second stage, a larger quantity of coarser seed is added to complete the precipitation. The first precipitation stage is accomplished in a temperature range of 66°–77° C. (151°–171° F.), then the second seeding and precipitation stage is carried out at about 40° C. (104° F.). The process as shown produces a relatively coarse material wherein the fine fraction produced (less than 45 micron size) is less than 15% by weight and under certain process conditions, can be within the range of 4–8% by weight of the produced hydrate. The yield of the alumina hydrate produced according to this patent varies widely depending upon the weight fraction of the fine (less than 45 micron size) alumina hydrate. Thus, a product yield of 71.1 grams $Al_2O_3$/l of liquor is reported at a 14.9% by weight fine fraction, an 83 g/l $Al_2O_3$ yield is obtained with an 18.6% by weight fine fraction, and the highest reported $Al_2O_3$ yield is 91.7 g/l at a 16.5% by weight fine content. The process disclosed in this patent, although capable of producing higher than conventional yields, is still hampered by the production of an unacceptably high fine fraction as indicated by the examples in the patent. In addition, the temperature drop required between the first and second stages requires extensive interstage cooling, and the use of different size seed materials necessitates the extensive use of expensive classifying equipment.

In U.S. Pat. No. 4,305,913 (1981), a three-stage process is disclosed for the production of coarse and strong alumina hydrate with yields in the range of 70–80 g/l. The process also produces a high percentage of coarse material, at least 90% by weight of the product has a size in excess of 45 microns. The process disclosed in this patent provides a significant advance in the precipitation art, since it is applicable to both the American and European Bayer processes. The need for three distinct but interconnected stages requires significant capital expenditure; in addition, classification associated with each stage adds to processing costs.

In German Offenlegungsschrift No. 3,324,378 (published Jan. 12, 1984), a precipitation process is described wherein coarse alumina hydrate is obtained at reported $Al_2O_3$ yields within the range of 77–85 grams/liter. The process shown involves the addition of large seed charges (800–1500 grams seed/liter of sodium aluminate solution) to the supersaturated sodium aluminate solution. The particle size distribution of the product alumina hydrate is controlled by the particle size distribution of the seed charge. Thus, if the fine fraction of the seed charge (less than 44 micron size) constituted 19% by weight of the total charge, the recovered product alumina hydrate also contained 19% by weight of fine fraction. Avoidance of the production of such large quantities of fine alumina hydrate as shown is only achieved by recycling major quantities of the slurry to a classification stage. This process, although capable of increasing $Al_2O_3$ yields, does not eliminate the production of large quantities of fines. It also involves the addition of very large seed charges which lead to operational difficulties and requires extensive classification if reduction of the fine content of the product hydrate is desired.

German Patentschrift No. 3,030,631 (first publication Feb. 19, 1981) provides a precipitation process wherein the supersaturated sodium aluminate solution is separated into two streams and each of these streams are separately seeded. Extensive recycling to allow sufficient residence time and, consequently, production of coarse agglomerates, is essential in this process, together with the use of a large number of classifiers to reduce the fine fraction in the product alumina hydrate. While the process allows production of coarse alumina hydrate product, it does so at the cost of yield and it also involves increased operating and capital costs.

It has now been found that alumina hydrate can be produced at high yields in the form of coarse and strong product from supersaturated sodium aluminate liquors resulting from both the American and European Bayer processes. The novel process utilizes a single, relatively small seed charge, which, when added to the entire liquor stream, will allow production of alumina hydrate of desired quality and yield without requiring the extensive recycle systems of the prior art or the need for large-scale use of interstage cooling and classification equipment.

BRIEF SUMMARY OF THE INVENTION

Coarse, strong alumina hydrate is recovered in high yields from Bayer process supersaturated sodium aluminate liquors by seeding the entire liquor in a first precipitation line with a relatively small seed charge, the charge being selected to provide a seed surface area-to-liquor volume ratio in the range from about 1 to 3 $m^2$/liter. The seeded liquor is kept at a temperature below about 68° C. to allow precipitation of alumina hydrate. The formed slurry containing from about 30–40 grams/liter precipitated solids is then transferred to a second precipitation line where the solids content of the slurry is allowed to increase without addition of more seed to a level in the range from about 250–700 g/l by accumulating solids from the transferred slurry. After sufficient residence time in the second line of precipitators under predetermined temperature conditions, the accumulated solids are subjected to a size classification stage to obtain a product wherein at least 95% by weight exhibits a particle size in excess of 44 microns and a fine fraction having an average particle size below 44 microns. The alumina hydrate product is recovered in yields of about 80 g/l or more and the fine fraction constituting only a very minor fraction of the total alumina hydrate production is recycled after washing as seed to the first precipitation line for the production of additional alumina hydrate. The process, due to the relatively low temperatures utilized, may dispense with the use of interstage cooling and thus can result in significant energy savings. Extensive recycle of alumina hydrate is also eliminated, as well as the need for large-scale use of classification equipment and additional precipitators.

BRIEF DESCRIPTION OF THE DRAWINGS

FIG. 1 shows a schematic diagram of the novel precipitation process employing a simple, relatively small seed charge for the precipitation of alumina hydrate from supersaturated Bayer process sodium aluminate liquors.

FIG. 2 shows a variation of the process, where a relatively small seed charge is utilized in a first precipitation stage and a conventional seed charge is used in a second precipitation stage to improve the yield and avoid formation of excessive fines in precipitation systems using existing conventional precipitation practices.

DETAILED DESCRIPTION OF THE INVENTION

This invention relates to the production of strong, coarse alumina hydrate at high yield from Bayer process sodium aluminate liquors. More particularly, it concerns a process wherein one relatively small, single seed charge is added to relatively cool supersaturated sodium aluminate liquors in a first precipitation line to precipitate a limited quantity of coarse alumina hydrate. The alumina hydrate containing slurry is then transferred to a second precipitation line, where the solids content of the slurry is allowed to increase during a predetermined residence time. In the second precipitation stage, growth and strengthening of the solids take place, resulting in the production of a coarse, strong alumina hydrate product which is recovered at high yield.

For the purposes of this invention, the terms "supersaturated sodium aluminate liquor" or "pregnant liquor" refer to a sodium aluminate solution which, under the conditions of the present precipitation process temperature, caustic and $Al_2O_3$ concentrations contains the maximum quantity of alumina dissolved which can be kept in solution without autoprecipitation.

The terms "alumina-to-caustic ratio" or "A/C" refer to the quantity of $Al_2O_3$ in grams/liter dissolved in a caustic solution, wherein the caustic concentration of the solution is expressed in $Na_2CO_3$ grams/liter.

The terms "precipitation line 1" or "first precipitation stage" refer to one or several parallelly arranged precipitation vessels, each of which is charged with pregnant liquor and also charged with seed to induce precipitation.

The terms "precipitation line 2"1 or "second precipitation stage" refer to at least one, preferably several, precipitation vessels connected in series.

In the process of the present invention, the pregnant liquor utilized in the precipitation system is generated by the digestion of bauxite. The bauxite employed in the digestion can be of any desired source, thus bauxites mind in the United States, the Caribbean, South America, Africa, Australia, Asia, and Europe, can be equally employed for the generation of pregnant liquors. The digestion conditions utilized for the production of the pregnant liquor can be the conventionally used American or European Bayer process conditions. With regard to the A/C ratios and caustic concentrations employed in the digestion stage, the conventionally utilized alumina and caustic concentrations are acceptable. Thus, the entire range of A/C ratios commonly used in both the American and European practices apply, i.e., A/C ratios within the range of 0.575 and 0.700, at caustic concentration values within the limits from about 165 to about 300 g/l can be utilized for the generation of the pregnant liquor employed in the precipitation system of the present invention.

In the following, the novel aspects of the precipitation process of the present invention will be explained in detail and with reference to the Figures. It is to be understood, however, that the schematic flowsheets shown in the Figures are for illustrative purposes only. It is not intended to limit the scope of the invention by simply referring to these.

As shown in FIG. 1, pregnant liquor from the digestion stage of the Bayer process is charged to a first precipitation stage. This first precipitation stage can consist of a single precipitation vessel, or if desired, of several precipitator vessels arranged in parallel relationship to each other. The pregnant liquor charged to the first precipitation line has an A/C ratio within the range from about 0.575 to about 0.700 and its caustic concentration is within the limits from about 165 g/l to about 300 g/l, preferably from about 175 g/l to about 250 g/l. The liquor charged to the first precipitator line is seeded with a charge of alumina hydrate seed to induce precipitation of dissolved alumina from the pregnant liquor.

The seed to be charged to the first precipitation stage has to meet certain specifications in accordance with the present invention. In the first instance, the seed should have a large fraction of fine particles, preferably up to about 50–70% by weight of the seed to be charged to the first precipitation stage should have a particle size below about 44 microns (0.044 mm).

The seed surface area to the pregnant liquor volume ratio is of prime importance for the purposes of this invention. While in conventional Bayer process precipitation practice the seed surface area to pregnant liquor volume is kept as high as possible and at not less than 6 m$^2$/liter of liquor and preferably up to about 15 m$^2$/l or more, it has now been found that for best results in the present process, seed areas from about 1 to about 3 m$^2$/l of pregnant liquor, preferably 1–2.5 m$^2$/l, should be employed for the liquor A/C ranges referred to above. Since the surface area of alumina hydrate seed having the particle size referred to above varies within the range of about 800–1500 m$^2$/g, the quantity of seed to be added to the pregnant liquor should be calculated based on the measured seed surface area and the seed surface area/liter of pregnant liquor ratio requirement. In the present process, the quantity of seed charge is generally 80–85% less than seed charges utilized by the prior art precipitation processes.

The temperature, where the seeding of the pregnant liquor is accomplished in accordance with the present process, is kept below about 68° C. (155° F.) and generally within the range from about 40° C. to about 68° C. The average residence time of the seeded pregnant liquor in the first precipitation stage is usually in the range from about 90 minutes to about 300 minutes. This average residence time at the given seed charge-to-liquor ratio and temperature range results in the precipitation of about 30 to 40 g/l alumina hydrate. During the time period referred to hereinabove, the precipitation vessel(s) may be agitated in a conventional manner, for example, by mechanical or air agitation, to achieve maximum contact of the low seed charge with the pregnant liquor.

From the first precipitation stage, the produced slurry is then introduced into the second precipitation line or stage. This precipitation stage can, as shown, consist of several precipitation vessels all arranged in series. Also, depending upon the number of first stage precipitation vessels employed in parallel, a number of second precipitation lines may be used in parallel, each line consisting of several vessels in series. The number of precipitation vessels used in both the first and second stages depends upon the Bayer process liquor volumes generated by the plant, the availability of vessels and other economic and operational considerations. This facet of the precipitation process is within the skill and knowledge of the practitioner. For the sake of ready understanding, this description, as indicated in FIG. 1, will only consider a single first stage precipitation vessel and a second precipitation stage consisting of several precipitation vessels connected in series.

Slurry from the first precipitation stage is charged to the second precipitation stage where the solids content of the slurry is allowed to increase from the initial 30–40 g/l to 250–700 g/l by the dual effect of further precipitation and accumulation of hydrate from the first stage. This is suitably accomplished by well-known techniques employed in the Bayer process. The average residence time of the solids in the second precipitation stage is within the range from about 30 to 90 hours. During this residence time, agglomeration and coarsening of the alumina hydrate takes place resulting in a strong, coarse product. The temperature in the second precipitation stage is kept within the range from about 40° to about 55° C. If the temperature in the second precipitation stage approximates the temperature maintained in the first stage, cooling will not be required when slurry is being transferred from one vessel to another within the second precipitation stage. If a significant temperature drop is desired between the individual precipitation vessels of the second precipitation line for optimization of the process, then so-called interstage cooling may be employed. However, the instant invention operating at relatively low precipitation temperatures allows, if so desired, the elimination of the need for interstage or intervessel cooling and thus can result in significant energy savings.

From the last precipitation vessel of the second precipitation stage, the high solids content slurry is introduced into a classifier where classification of the solids by particle size takes place. Due to the novel use of low seed charge in the first precipitation stage, in combination with the high solids second stage precipitation line, the process results in an alumina hydrate product which consists of at least about 90%, preferably 95%, by weight of coarse, strong particles having a particle size in excess of 44 microns in a yield (based on the Al$_2$O$_3$ content of the supersaturated sodium aluminate liquor) of about 80 g/l.

From the classification stage, the overflow, containing the fine fraction, is introduced into a clarifier-settler where the slurry is allowed to settle in order to separate the finely divided alumina hydrate particles from the spent Bayer process liquor. The spent liquor, having an A/C ratio in the range from about 0.350 to about 0.375 is recycled to the Bayer process after its caustic concentration is increased, for example, by evaporation and/or addition of caustic. The fine alumina hydrate discharged in the underflow from the settler is subjected to a washing treatment to remove adhered impurities therefrom. The washed hydrate is then employed as seed for precipitation of alumina hydrate in the first precipitation stage of the instant process.

The process of the present invention involving the use of a relatively small seed charge in the first precipitation stage can also be advantageously employed in conventional batch or continuous precipitation systems where under the known precipitation conditions excessive production of finely divided alumina hydrate occurs. As mentioned hereinbefore, many conventional precipitation processes produce a large fraction of fines and/or weak alumina hydrate which necessitates extensive recycling of the slurry and the large-scale utilization of classification apparatus, both of which result in operational difficulties and significantly increased operating and capital expenditures. To minimize these disadvantages, it has been found that the process of the invention can be adapted to conventional precipitation systems where multiple seeding is utilized. Thus, as shown in FIG. 2, in a first precipitation stage, only a small quantity of seed is added to the pregnant liquor and then the produced slurry is introduced into a second precipitation line as taught by the present invention. In the second precipitation stage, accumulation of the solids content is achieved in accordance with the invention, however, reduction of fine particle generation and production can be achieved by recycling a portion of the medium sized alumina hydrate particles to at least one, preferably to more, precipitation vessels in the second precipitation stage. These particles are cemented and strengthened along with the coarse agglomerates generated in the second stage, thus producing strong alumina hydrate products in addition to reducing the overall quantity of fines. As shown in FIG. 2, in the event the inventive process is employed in combination with conventional precipitation systems, the high solids content slurry discharged from the second precipitation line is subjected to a classification step (primary thickener) to separate the product alumina hydrate from the fine fraction. The overflow slurry from the thickener containing the finer fraction is then subjected to a second thickening step and the underflow containing slightly coarsened but still fine alumina hydrate is recycled to the second precipitation stage as seed to aid in precipitation and accomplish cementation. The overflow slurry is charged to a third thickener from where the underflow, consisting of alumina hydrate of fine particle size, is subjected to a washing step and the washed hydrate is used as seed in the first precipitation stage in accordance with the process of the present invention.

The following examples are given to further facilitate the understanding of the invention.

EXAMPLE 1

Pregnant Bayer process liquor having an A/C ratio of 0.675 and a caustic concentration (expressed as g/l $Na_2CO_3$) of 266 g/l was continuously charged to a first precipitation stage at a rate of 12.6 m$^3$/min (3300 gpm) where it was contacted with alumina hydrate seed. The alumina hydrate seed employed had a particle size distribution wherein particles having a particle size below 44 microns constituted about 45% by weight of the seed charge. The amount of seed charge to this precipitation stage was selected to provide a seed surface area of approximately 2 m$^2$/liter of pregnant liquor and the average surface area of the seed was in the range of about 800–1500 m$^2$/g. The temperature of the seeded pregnant liquor was maintained within the range from about 60° to about 65° C. (140°–150° F.) and the average residence time of the seeded liquor in the first precipitation stage was kept within the limits of about 120–180 minutes. The produced slurry containing approximately 34–36 g/l solids was then continuously charged to a second precipitation stage consisting of eleven precipitators connected in series. The solids content of the slurry in each of these precipitator vessels was increased to about 400–450 g/l by allowing solids to accumulate in each of these vessels. Transfer of slurry from one vessel to another was accomplished by gravity. The temperature in the second precipitation stage was so controlled as to achieve an approximate temperature drop across the eleven precipitator vessels of about 20°–24° C., resulting in a final temperature of about 40°–42° C. in the last precipitation vessel of the series. The average residence time of the slurry in each vessel of this stage was about 3–4 hours. From the last precipitation vessel of the second precipitation stage, the slurry of high solids content was charged to a classifier where the product alumina hydrate was removed with the underflow and the overflow containing the fine fraction was charged to a clarifier. From the clarifier, the separated fine alumina hydrate was charged to a washing stage to remove adhered and adsorbed impurities, such as organics, and the washed fine hydrate was then used as seed to initiate precipitation in fresh Bayer process pregnant liquor introduced in the first precipitation stage. The overflow spent liquor had an A/C finishing ratio of about 0.375 and it was recycled to the Bayer process.

The product hydrate recovered from the classification stage was analyzed for particle size distribution and strength. It was found that about 95% by weight of the product hydrate consisted of particles having a size in excess of 44 microns and the attrition test of the product hydrate indicated high strength. Only a very small portion of the hydrate suffered attrition when subjected to an attrition test. The yield of product hydrate from the precipitation was 80.5 g/l based on the alumina ($Al_2O_3$) content of the pregnant liquor from which it was recovered. The fine fraction removed from the classifier was also analyzed for particle size distribution, and it was found that about 45% by weight of the fine fraction had a particle size below 44 microns.

EXAMPLE 2

In this example, the beneficial effects of the process of the invention on a conventional precipitation system are shown. In the conventional system, unacceptable quantities of fine, weak alumina hydrate particles (less than 44 micron size) are produced unless the produced fine hydrate is recycled in large quantities to the precipitation stage to allow agglomeration and growth. To avoid the need for such extensive recycle and associated operational and capital costs, the conventional precipitation system, involving addition of seed in more than one stage, was combined with the precipitation process of the present invention. The novel process utilizing a single, relatively small seed charge in a first precipitation stage in contact with the entire pregnant liquor stream is established, as shown in FIG. 2, ahead of the conventional system. Thus, pregnant liquor having an A/C ratio of 0.700 and a caustic concentration of 215 g/l was contacted with a charge of fine alumina hydrate seed. The fine alumina hydrate seed contained about 45% by weight particles having an average particle size below 44 microns. The pregnant liquor kept at 68° C. (155° F.) was seeded in a first precipitation stage with sufficient seed to obtain an approximately 2 m$^2$ seed surface area per liter of pregnant liquor. The contact between the seed and the liquor was maintained for an average time period within the range from about 150–200 minutes, then the produced slurry containing from about 30 to about 40 g/l solids was transferred into a second precipitation stage consisting of eleven precipitation vessels in series. A solids content of about 250 g/l was established in each of the vessels by the addition of seed derived from the secondary thickener shown in the Figure. The seed surface area to pregnant liquor volume in this second stage seeding was established at 4 m²/l and the solids in the precipitators were allowed to strengthen and grow during a 2–3 hour average residence time in each vessel of the second precipitation stage. From the last precipitator vessel of the series, the slurry was discharged into a primary thickener where separation of the product hydrate from the fine fraction took place. The product hydrate was recovered and its average particle size distribution showed that particles in excess of 95% by weight had a size in excess of 44 microns. The overflow from the primary thickener was charged to a secondary thickener where classification took place by size. The coarser particles recovered from the underflow were used as seed for the second precipitation stage, while the overflow was charged to a tertiary thickener. From the underflow of the tertiary thickener, fine particles (average particle size 44μ or less) were recovered and after washing, used as seed for the first precipitation stage. The overflow spent liquor was recycled to the Bayer process after reestablishment of its caustic concentration.

The product hydrate recovered from the primary thickener was obtained in a yield in excess of about 75 g/l; the major improvement observed by the combination described resulted in the reduction of the overall fine particle generation. It was found that the fine particle generation of the combined process was substantially less in comparison to the conventional precipitation process. The combination shown resulted in a total fine particle content reduction of about 10%. In addition, the produced product hydrate had high strength characterized by at least about a 10% increase in attrition resistance.

We claim:

1. In the process of producing alumina hydrate from supersaturated Bayer process sodium aluminate liquors, the liquors being derived from the digestion of bauxite at elevated temperatures and pressures with a caustic medium, by seeding the liquors with an alumina hydrate seed charge to initiate precipitation of alumina hydrate from the supersaturated liquors, the improvement which comprises:

(a) introducing a supersaturated sodium aluminate liquor into one or more precipitation vessels defined as first precipitation stage, the liquor being characterized by an alumina ($Al_2O_3$) to caustic weight ratio (A/C) from about 0.575 to about 0.700, wherein the caustic concentration, expressed in grams/liter $Na_2CO_3$, is in the range from about 165 to about 300 grams/liter;

(b) seeding the liquor with an alumina hydrate seed charge characterized by a particle size distribution wherein up to about 50% by weight of the seed charge consists of particles having a particle size below about 44 microns, the quantity of the seed charge being so selected as to establish a seed charge surface area in relation to the liquor to be seeded within the range from about 1 to about 3 m²/liter of liquor;

(c) maintaining the seeded liquor at a temperature below about 68° C. (155° F.) for an average time period from about 90 to about 300 minutes to allow precipitation of alumina hydrate and the generation of a slurry having a solids content in the range from about 30 to about 40 g/l;

(d) transferring the slurry into a second precipitation stage, where the slurry solids content is allowed to increase to about 250–700 g/l, without additional seeding, by accumulating solids from the first precipitation stage and maintaining the slurry of increased solids content in the second precipitation stage for a time period sufficient to allow agglomeration and growth of the solids within the temperature range from about 40° to about 55° C. (105°–131° F.);

(e) subjecting the slurry, having the significantly increased solids content, to a separation treatment to recover product alumina hydrate from the slurry, the product being characterized by an average particle size distribution wherein at least about 95% by weight of the particles have a size in excess of 44 microns, and a fine fraction, characterized by a particle size distribution wherein up to about 50% by weight of the particles have a size below about 44 microns and a liquor having an A/C ratio of about 0.375 or less;

(f) recovering the separated product alumina hydrate in a yield of about 80 g/l and above, based on the dissolved alumina ($Al_2O_3$) content of the supersaturated liquor subjected to precipitation in the first precipitation line and subjecting the fine fraction to a washing step to remove adhered impurities and recycling the washed fraction to the first precipitation stage as seed charge.

2. Process according to claim 1, wherein the seed charge in the first precipitation stage is kept within the range of from about 1 to about 2.5 m²/liter of liquor.

3. Process according to claim 1, wherein the seeded liquor is maintained within the temperature range from about 40° to about 68° C. in the first precipitation stage.

4. Process according to claim 1, wherein the average residence time of the solids in the second precipitation stage is within 30–90 hours.

5. In the process of producing alumina hydrate from supersaturated Bayer process sodium aluminate liquors, the liquors being derived from the digestion of bauxite at elevated temperatures and pressures with a caustic medium, by seeding the liquors with an alumina hydrate seed charge to initiate precipitation of alumina hydrate from the supersaturated liquors, the improvement which comprises:

(a) introducing a supersaturated sodium aluminate liquor into one or more precipitation vessels defined as first precipitation stage, the liquor being characterized by an alumina ($Al_2O_3$) to caustic weight ratio (A/C) from about 0.575 to about 0.700, wherein the caustic concentration, expressed in grams/liter $Na_2CO_3$, is in the range from about 165 to about 300 grams/liter;

(b) seeding the liquor with an alumina hydrate seed charge characterized by a particle size distribution wherein up to about 50% by weight of the seed charge consists of particles having a particle size below about 44 microns, the quantity of the seed charge being so selected as to establish a seed charge surface area in relation to the liquor to be seeded within the range from about 1 to about 3 m²/liter of liquor;

(c) maintaining the seeded liquor at a temperature below about 68° C. (155° F.) for an average time period from about 90 minutes to about 300 minutes to allow precipitation of alumina hydrate and the generation of a slurry having a solids content in the range from about 30 to about 40 g/l;

(d) transferring the slurry into a second precipitation stage, where the solids content of the slurry is allowed to accumulate to about 250–700 g/l and introducing additional seed into the slurry, the additional seed charge being so selected as to establish a seed surface area in relation to the slurry to be seeded within the range from about 5 to about 10 $m^2$/liter of slurry;

(e) maintaining the slurry for a time sufficient to allow agglomeration, growth, and cementation of the solids within the temperature range from about 40° to about 68° C.;

(f) subjecting the slurry to a size classification stage to separate product alumina hydrate, characterized by a particle size distribution wherein at least about 95% by weight of the particles have a size in excess of 44 microns, and a fine fraction which is subjected to a further classification stage to recover a relatively coarse alumina hydrate fraction which is employed as seed charge in the second precipitation stage and a fine fraction dispersed in the slurry;

(g) introducing the slurry containing the fine fraction into a clarifier-settler to provide a fine seed product which after washing is used as seed in the first precipitation stage and a spent liquor which is recycled to the Bayer process.

6. Process according to claim 5, wherein the seed charge in the first precipitation stage is kept within the range from about 1 to about 2.5 $m^2$/liter of liquor.

7. Process according to claim 5, wherein the seeded liquor is maintained within the temperature range from about 40° to about 68° C. in the first precipitation stage.

8. Process according to claim 5, wherein the average residence time of the slurry in the second precipitation stage is within 20–60 hours.

9. Process according to claim 5, wherein the particle size distribution of the seed charge introduced into the second precipitation stage is such that not more than 12–15 weight percent of the particles have a particle size below 44 microns.

* * * * *